US012670880B2

(12) United States Patent
Ho et al.

(10) Patent No.: US 12,670,880 B2
(45) Date of Patent: Jun. 30, 2026

(54) SCAN DRIVING METHOD FOR HIGH-QUALITY IMAGE AND CHOLESTERIC LIQUID-CRYSTAL DISPLAY DEVICE USING THE SAME

(71) Applicant: IRIS OPTRONICS CO., LTD., Tainan City (TW)

(72) Inventors: Yu Sheng Ho, Tainan City (TW); Hui Cheng Lin, Tainan City (TW); Chia Che Wu, Tainan City (TW); Wu Chang Yang, Tainan City (TW); Chi Chang Liao, Tainan City (TW)

(73) Assignee: IRIS OPTRONICS CO., LTD., Tainan City (TW)

( * ) Notice: Subject to any disclaimer, the term of this patent is extended or adjusted under 35 U.S.C. 154(b) by 0 days.

(21) Appl. No.: 19/098,956

(22) Filed: Apr. 2, 2025

(65) Prior Publication Data

US 2025/0372056 A1      Dec. 4, 2025

Related U.S. Application Data

(60) Provisional application No. 63/654,247, filed on May 31, 2024.

(51) Int. Cl.
*G09G 3/36* (2006.01)
*G02F 1/1343* (2006.01)
*G02F 1/137* (2006.01)

(52) U.S. Cl.
CPC ..... *G09G 3/3629* (2013.01); *G02F 1/134309* (2013.01); *G02F 1/13718* (2013.01);
(Continued)

(58) Field of Classification Search
CPC ......... G09G 3/3629; G09G 2320/0257; G09G 2320/066; G02F 1/134309; G02F 1/13718
See application file for complete search history.

(56) References Cited

U.S. PATENT DOCUMENTS 5,684,503 A       11/1997   Nomura et al.
6,803,899 B1 *   10/2004   Masazumi   ...........   G09G 3/3629
                                                        345/103
(Continued)

OTHER PUBLICATIONS

Extended European Search Report mailed Jul. 25, 2025 in counterpart European application EP25 175 304.2, 11 pages in English.

*Primary Examiner* — Matthew A Eason
*Assistant Examiner* — Chayce R Bibbee
(74) *Attorney, Agent, or Firm* — Juan Carlos A. Marquez; Marquez IP Law Office, PLLC

(57) ABSTRACT

A display device is provided, which includes a display panel. The display panel includes a first substrate, a second substrate, a cholesteric liquid-crystal (ChLC) layer, and a driving circuit section. A plurality of first electrodes formed on the first substrate extend in a first direction. A plurality of second electrodes formed on the second substrate extend in a second direction different from the first direction. The ChLC layer is formed between the first substrate and the second substrate. The driving circuit section is configured to apply a plurality of alternating-current (AC) voltage pulses to pixel circuits at intersections between the first electrodes and the second electrodes. The driving circuit section is further configured to perform a full screen reset procedure to the display panel followed by a pulse-width modulation (PWM) scanning procedure to control cholesteric molecules within the pixel circuits to enter a focal conic state.

6 Claims, 10 Drawing Sheets

(52) U.S. Cl.
      CPC ............... *G09G 2320/0257* (2013.01); *G09G 2320/066* (2013.01)

(56)                        References Cited

U.S. PATENT DOCUMENTS

| | | | |
|---|---|---|---|
| 12,217,716 B1 | 2/2025 | Tseng et al. | |
| 2003/0122764 A1 | 7/2003 | Lee et al. | |
| 2008/0042959 A1* | 2/2008 | Ben-Shalom ........ | G09G 3/3629 |
| | | | 345/94 |
| 2009/0184944 A1* | 7/2009 | Ishii ......................... | G09G 3/36 |
| | | | 345/204 |
| 2009/0322663 A1* | 12/2009 | Nose ................... | G09G 3/3629 |
| | | | 345/89 |
| 2017/0092173 A1* | 3/2017 | de Greef .............. | G09G 3/2003 |

* cited by examiner

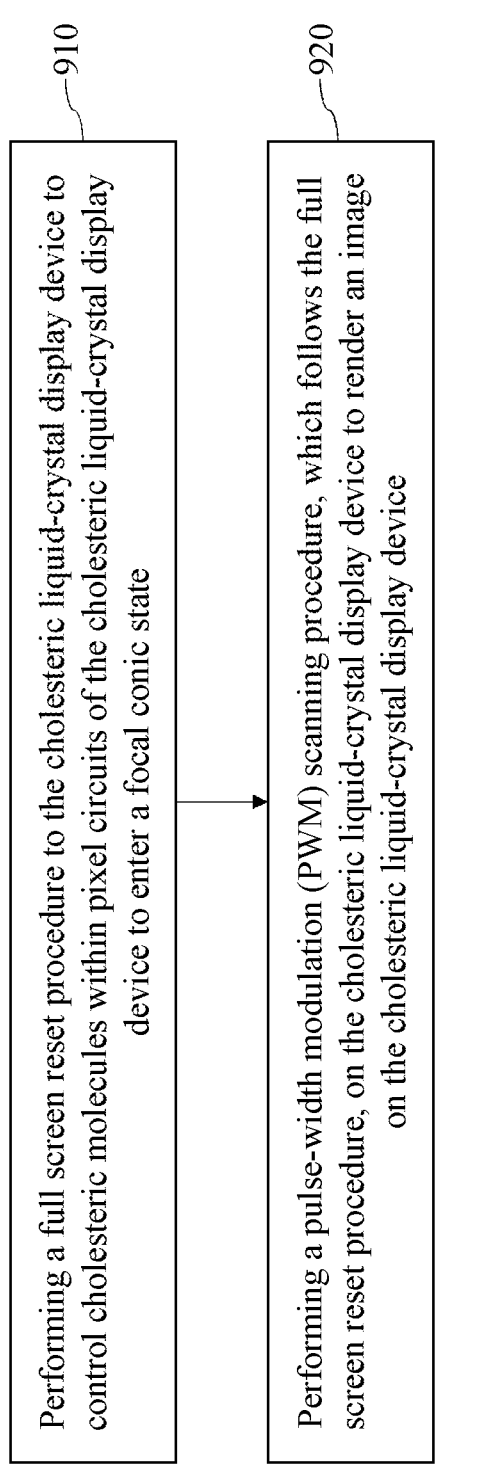

900

Performing a full screen reset procedure to the cholesteric liquid-crystal display device to control cholesteric molecules within pixel circuits of the cholesteric liquid-crystal display device to enter a focal conic state —910

Performing a pulse-width modulation (PWM) scanning procedure, which follows the full screen reset procedure, on the cholesteric liquid-crystal display device to render an image on the cholesteric liquid-crystal display device —920

FIG. 9

SCAN DRIVING METHOD FOR HIGH-QUALITY IMAGE AND CHOLESTERIC LIQUID-CRYSTAL DISPLAY DEVICE USING THE SAME

CROSS REFERENCE TO RELATED APPLICATION

This application claims the benefit of U.S. Provisional Application No. 63/654,247 filed on May 31, 2024, the entirety of which is incorporated by reference herein.

TECHNICAL FIELD

The present invention relates to display devices, and in particular, to a scan driving method for high-quality images and cholesteric liquid-crystal display device using the same.

DESCRIPTION OF THE RELATED ART

The display screen of a cholesteric liquid-crystal (ChLC) display device can be reset by controlling the ChLC molecules within the ChLC display device to enter the planar state (e.g., bright state) during a reset stage of the PWM (pulse width modulation) scanning method. However, increasing the scanning time can lead to decreased reflectivity of the ChLC molecules in both the dark state (e.g., focal conic state) and the bright state (e.g., planar state), limiting the effectiveness of improving screen contrast through increased scanning time in PWM scanning methods.

Therefore, there is a need for a scan driving method for high-quality image and cholesteric liquid-crystal display device using the same to resolve the aforementioned issues.

SUMMARY

In an aspect of the present disclosure, a display device is provided, which includes a display panel. The display panel includes a first substrate, a second substrate, a cholesteric liquid-crystal (ChLC) layer, and a driving circuit section. A plurality of first electrodes formed on the first substrate extend in a first direction. A plurality of second electrodes formed on the second substrate extend in a second direction different from the first direction. The ChLC layer is formed between the first substrate and the second substrate. The driving circuit section is configured to apply a plurality of alternating-current (AC) voltage pulses to pixel circuits at intersections between the first electrodes and the second electrodes. The driving circuit section is further configured to perform a full screen reset procedure to the display panel followed by a pulse-width modulation (PWM) scanning procedure to control cholesteric molecules within the pixel circuits to enter a focal conic state.

In another aspect of the present disclosure, a scan driving method for use in a cholesteric liquid-crystal display device is provided. The method includes the following steps: performing a full screen reset procedure to the cholesteric liquid-crystal display device to control cholesteric molecules within pixel circuits of the cholesteric liquid-crystal display device to enter a focal conic state; and performing a pulse-width modulation (PWM) scanning procedure, which follows the full screen reset procedure, on the cholesteric liquid-crystal display device to render an image on the cholesteric liquid-crystal display device.

BRIEF DESCRIPTION OF THE DRAWINGS

Aspects of the present disclosure are best understood from the following detailed description when read with the accompanying figures. It is noted that in accordance with the standard practice in the industry, various features are not drawn to scale. In fact, the dimensions of the various features may be arbitrarily increased or reduced for clarity of discussion.

FIG. 9 is a flowchart of a method for driving a cholesteric liquid-crystal display in accordance with some embodiments.

DETAILED DESCRIPTION

Figure 1:
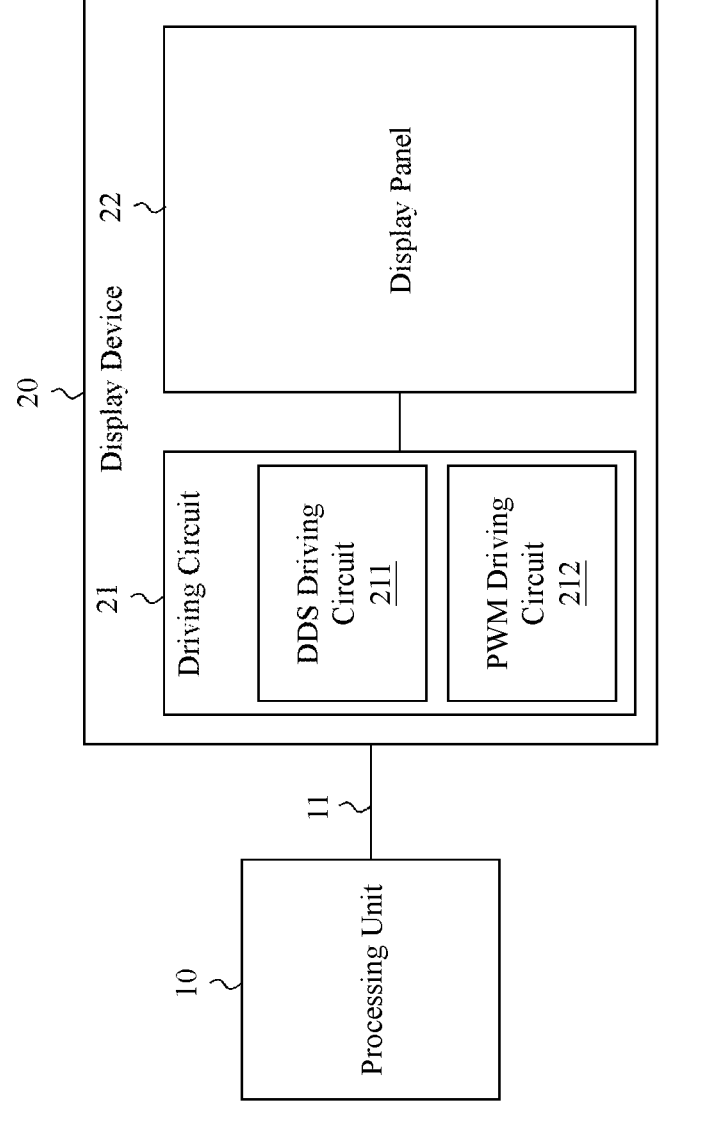
FIG. 1 is a block diagram of an electronic device in accordance with an embodiment of the present disclosure.

The following disclosure provides many different embodiments, or examples, for implementing different features of the provided subject matter. Specific examples of operations, components, and arrangements are described below to simplify the present disclosure. These are, of course, merely examples and are not intended to be limiting. For example, a first operation performed before or after a second operation in the description may include embodiments in which the first and second operations are performed together, and may also include embodiments in which additional operations may be performed between the first and second operations. For example, the formation of a first feature over, on or in a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Time relative terms, such as "prior to," "before," "posterior to," "after" and the like, may be used herein for ease of description to describe the relationship of one operation or feature to another operation(s) or feature(s) as illustrated in the figures. Such time relative terms are intended to encompass different sequences of the operations depicted in the figures. Further, spatially relative terms, such as "beneath,"

"below," "lower," "above," "upper" and the like, may be used herein for ease of description to describe the relationship of one element or feature to another element(s) or feature(s) as illustrated in the figures. Such spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. Relative terms for connections, such as "connect," "connected," "connection," "couple," "coupled," "in communication," and the like, may be used herein for ease of description to describe an operational connection, coupling, or linking one between two elements or features. The relative terms for connections are intended to encompass different connections, couplings, or linkings of the devices or components. The devices or components may be directly or indirectly connected, coupled, or linked to one another through, for example, another set of components. The devices or components may be connected, coupled, or linked with each other by wire and/or wirelessly.

As used herein, the singular terms "a," "an," and "the" may include plural referents unless the context clearly indicates otherwise. For example, reference to a device may include multiple devices unless the context clearly indicates otherwise. The terms "comprising" and "including" may indicate the existences of the described features, integers, steps, operations, elements, and/or components, but may not exclude the existence of combinations of one or more of the features, integers, steps, operations, elements, and/or components. The term "and/or" may include any or all combinations of one or more listed items.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

The nature and use of the embodiments are discussed in detail as follows. It should be appreciated, however, that the present disclosure provides many applicable inventive concepts that can be embodied in a wide variety of specific contexts. The specific embodiments discussed are merely illustrative of specific ways to embody and use the disclosure, without limiting the scope thereof.

FIG. 1 is a block diagram of an electronic device in accordance with an embodiment of the present disclosure.

In some embodiments, the electronic device 1 may be an E-book, and E-paper, an electronic whiteboard, a temperature display board, etc., but the present disclosure is not limited thereto. As depicted in FIG. 1, the electronic device 1 may include a processing unit 10 and a display device 20. The processing unit 10 may be a central processing unit (CPU), a digital signal processor (DSP), an image signal processor (ISP), a microprocessor, a microcontroller unit (MCU), or any other equivalent circuit, but the present disclosure is not limited thereto. The display device 20 may be cholesteric liquid-crystal display (ChLCD) device.

In some embodiments, the display device 20 may include a driving circuit 21 and a display panel 22. The display panel 22 may be a ChLCD panel which includes multiple ChLC layers for red, green, and blue pixel arrays. Additionally, the driving circuit 21 may include a dynamic driving scheme (DDS) driving circuit 211 and a pulse width modulation (PWM) driving circuit 212. In some embodiments, one of the DDS driving circuit 211 and the PWM driving circuit 212 is used to drive the display panel 22. In other words, the display panel 22 can be driven either in a DDS driving mode or a PWM driving mode, depending on the driving mode selected by the driving circuit 21.

In some embodiments, the DDS driving mode exhibits certain characteristics, such as a faster scan speed and high image contrast in display effects. However, the color scale effect is not ideal because the reflectivity is significantly reduced when displaying colors in the dark state, typically around 4.5%. Additionally, the grayscale depth of the DDS driving mode is relatively limited, usually ranging from 4 to 8 levels. The PWM driving mode possesses certain characteristics, including a slower scan speed and poorer image contrast in display effects. However, the color scale display effect is better in the PWM driving mode because the reflection is reduced when displaying colors in the dark state, with a typical reflectivity of around 6%. Additionally, the PWM driving mode offers a relatively higher grayscale color depth, typically divided into 16 levels.

Figure 2A:
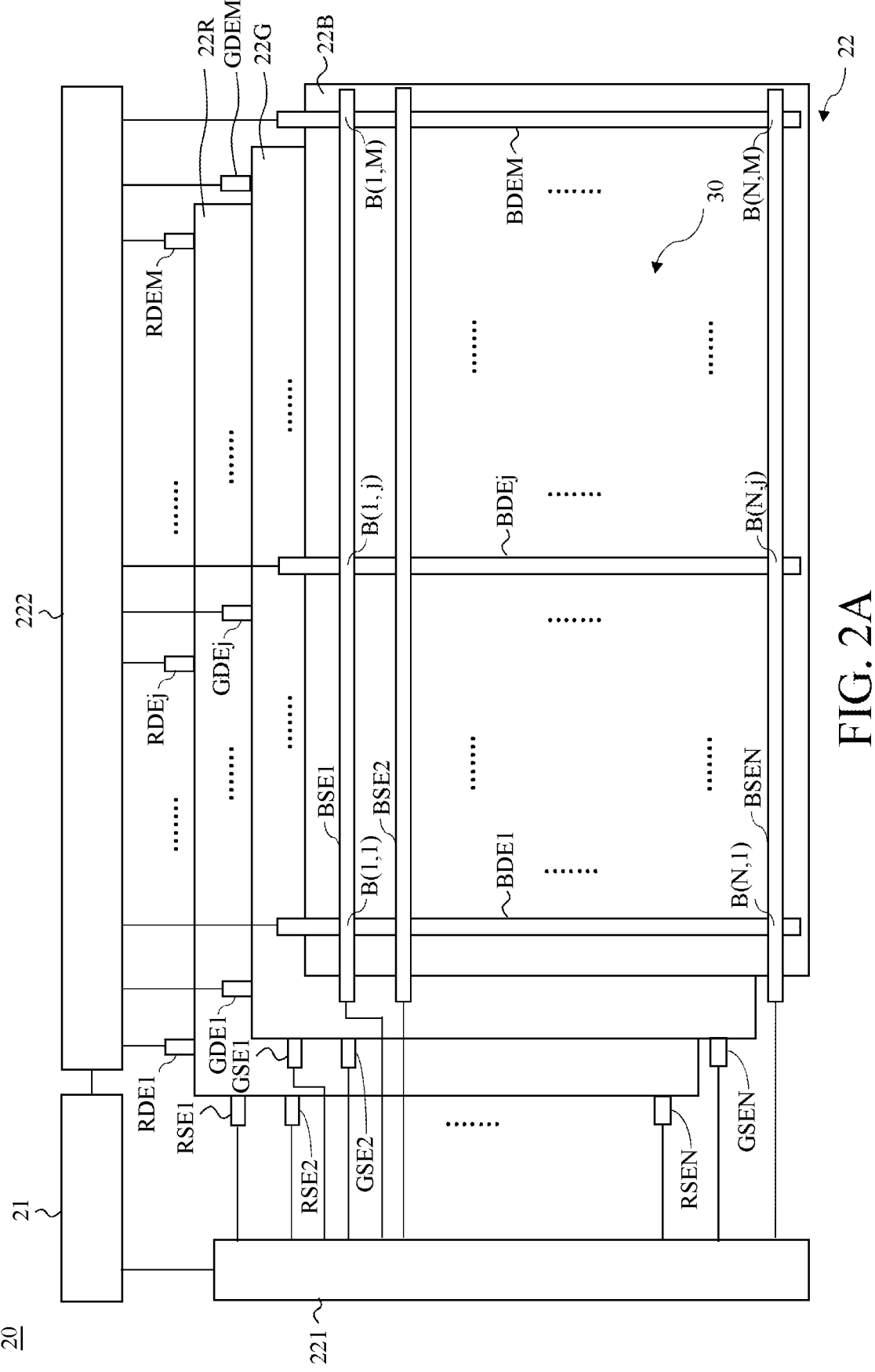
FIG. 2A is a diagram of a display device in accordance with the embodiment of FIG. 1.
Figure 2B:
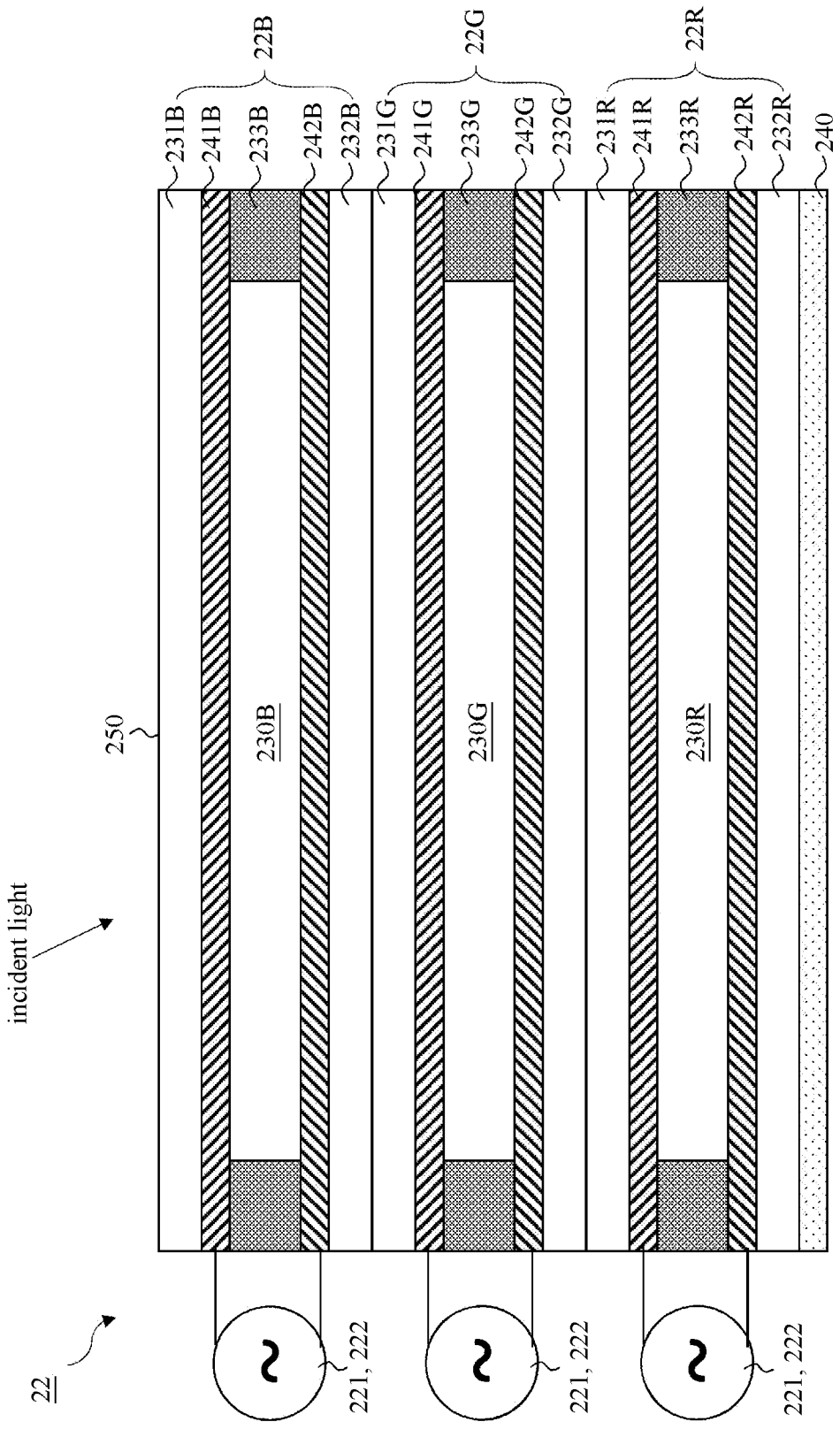
FIG. 2B is a cross section of the display panel in FIG. 2A.

FIG. 2A is a diagram of a display device in accordance with the embodiment of FIG. 1. FIG. 2B is a cross section of the display panel in FIG. 2A.

In some embodiments, the display panel 22 may include a plurality of display units 22B, 22G, and 22R, a scanning electrode driving circuit 221, and a data electrode driving circuit 222, as depicted in FIG. 2A. Additionally, the display units 22B, 22G, and 22R can be stacked to form the display panel, with the display units 22B, 22G, and 22R being the topmost, middle, and bottom display units, respectively, as shown in FIG. 2B. The display units 22B, 22G, and 22R may include pixels that display blue, green, and red colors, respectively, allowing the display panel 22 to render a screen 30 (e.g., a color display screen). The display unit 22B may include scanning electrodes BSE1 to BSEN (e.g., N electrodes along the Y-axis) and data electrodes BDE1 to BDEM (e.g., M electrodes along the X-axis). The scanning electrodes and data electrodes in the display units 22G and 22R are arranged in a similar manner.

In some embodiments, the scanning electrodes BSE1 to BSEN can be referred to as common (COM) electrodes, and the data electrodes BDE1 to BDEM can be referred to as segment (SEG) electrodes. Furthermore, the scanning electrodes BSE1 to BSEN and the data electrodes BDE1 to BDEM intersect in the top view of the display panel 22, as depicted in FIG. 2A.

In some embodiments, a pixel circuit (e.g., a ChLC pixel circuit, not explicitly shown in FIG. 2A) is disposed at each intersection between the scanning electrodes BSE1 to BSEN and data electrodes BDE1 to BDEM within the display unit 22B. This arrangement allows the pixel circuits within the display unit 22B to form a blue pixel array with a resolution of M*N. For example, the pixel circuit located at the intersection between the scanning electrode BSE1 and the data electrode BDE1 within the display unit 22B (e.g., for blue color) can be assigned the coordinates B(1, 1), while the pixel circuit at the intersection between the scanning electrode BSEN and the data electrode BDEj within the display unit 22B can be assigned the coordinates B(N, j), and so on.

Similarly, the display unit 22G may include scanning electrodes GSE1 to GSEN (e.g., N electrodes along the Y-axis) and data electrodes GDE1 to GDEM (e.g., M electrodes along the X-axis). The coordinates for each pixel circuit located at the intersections between the scanning electrodes GSE1 to GSEN and data electrodes GDE1 to GDEM within the display unit 22G can be assigned in a similar manner to those within the display unit 22B.

Similarly, the display unit 22R may include electrodes RSE1 to RSEN (e.g., N electrodes along the Y-axis) and data electrodes RDE1 to RDEM (e.g., M electrodes along the X-axis). The coordinates for each pixel circuit located at the intersections between the scanning electrodes RSE1 to RSEN and data electrodes RDE1 to RDEM within the display unit 22R can be assigned in a similar manner to those within the display unit 22B.

Moreover, the scanning electrodes BSE1 to BSEN, GSE1 to GSEN, and RSE1 to RSEN within the display units 22B, 22G, and 22R may be electrically connected to a scanning electrode driving circuit 221. In some embodiments, when the first row of the display panel 22 is to be activated, the scanning electrode driving circuit 221 may apply a voltage pulse to the scanning electrodes BSE1, GSE1, and RSE1 (e.g., common electrodes) to activate them simultaneously. In other words, the scanning electrodes with the same row number may be activated simultaneously by the scanning electrode driving circuit 221. In some embodiments, the scanning electrode driving circuit 221 and the data electrode driving circuit 222 can be collectively regarded as a driving circuit section.

In some embodiments, the scanning electrode driving circuit 221 is capable of activating one or more rows (i.e., scanning electrodes) of the display panel 22. For example, when two adjacent rows (e.g., rows n and (n+1)) of the display panel 22 are to be activated simultaneously, the scanning electrode driving circuit 221 may apply a first driving voltage to the scanning electrodes BSEn, GSEn, and RSEn at row n simultaneously, and apply a second driving voltage to the scanning electrodes BSE(n+1), GSE(n+1), and RSE(n+1) at row (n+1) simultaneously. It should be noted that the current stages of rows n and (n+1) can be different, resulting in the first driving voltage being different from the second driving voltage.

Referring to FIG. 2B, in some embodiments, the display units 22B, 22G, and 22R may be laminated in this order on a surface (e.g., surface 250) of incident light. The display unit 22B may include a ChLC layer 230B, substrates 231B and 232B, layers 241B and 242B, and sealing materials 233B. For example, the ChLC layer 230B may be sealed between the substrates 231B and 232B opposite to each other by the sealing material 233B applied onto the edges of the substrates 231B and 232B. Additionally, the average refractive index n and the helical pitch p of ChLC layer 230B are determined such that, for example, the wavelength λ is approximately 480 nm. The average refractive index n can be adjusted by selecting a liquid-crystal material and a chiral material, and the helical pitch p can be adjusted by adjusting the content of the chiral material. Accordingly, the ChLC layer 230B may selectively reflect blue light in a planar state. The layers 241B and 242B may refer to regions on which the scanning electrodes BSE1 to BSEN and data electrodes BDE1 to BDEM within the display unit 22B are disposed, that are electrically connected to the scanning electrode driving circuit 221 and the data electrode driving circuit 222, respectively. Furthermore, in the focal conic state, the liquid-crystal molecules within the ChLC layer 230B are disorderly rotated in the electrodes (e.g., layers 241B and 242B) to form helical structure, and the helical axes of the helical structures are randomly orientated. As a result, the selectivity of the ChLC layer 230B with respect to a reflection wavelength is lost, and the ChLC layer 230B transmits most of incident light. The transmitted light is absorbed by a light absorbing layer 240 whereby dark (black) display is achieved. The light absorbing layer 240 may be provided on the bottom surface of the display unit

22R. The display units 22G and 22R have a similar structure as the display unit 22B, and thus the details thereof are not repeated here.

Figure 3:
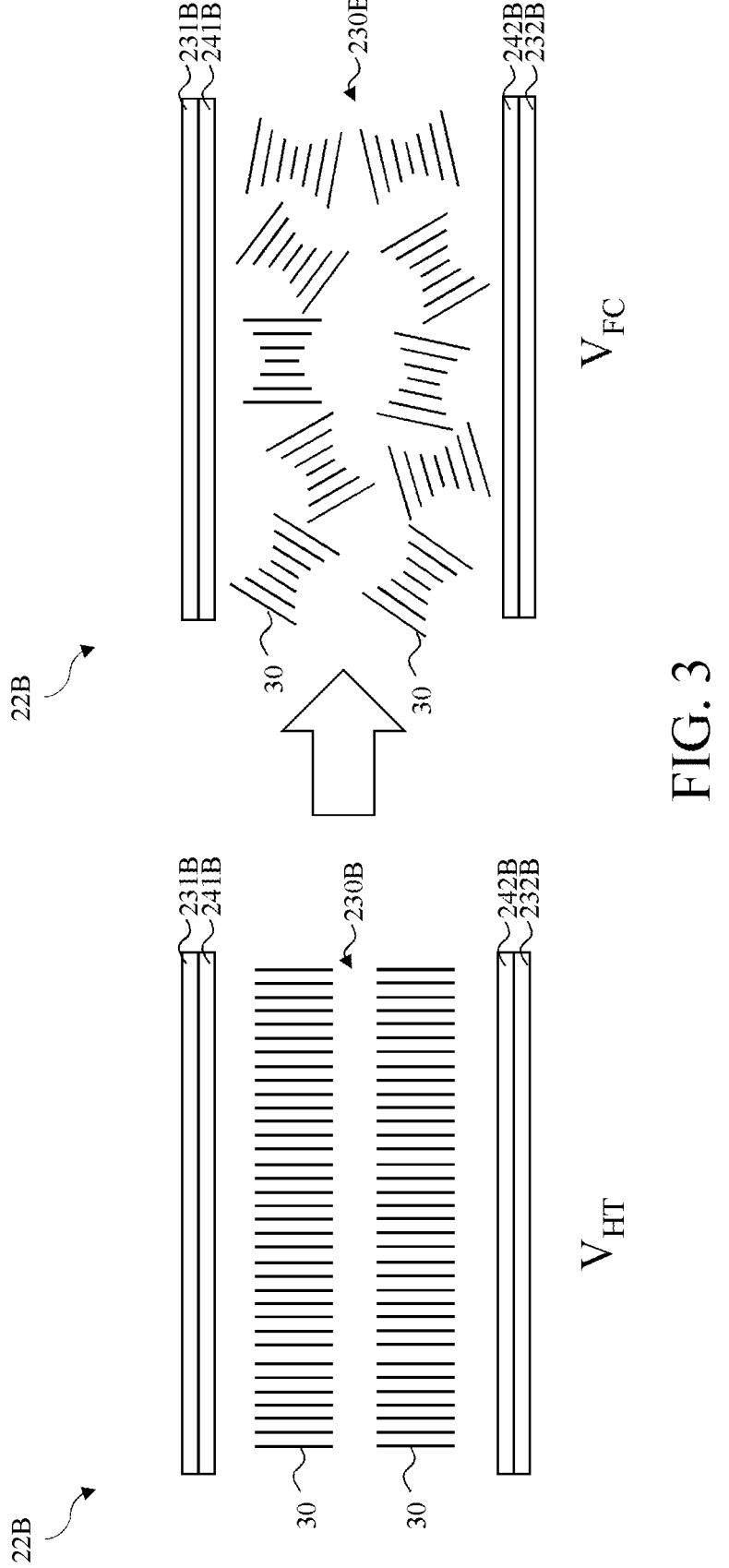
FIG. 3 is a diagram illustrating the state transitions of the ChLC molecules during the reset stage of the PWM scanning procedure.
Figure 4:
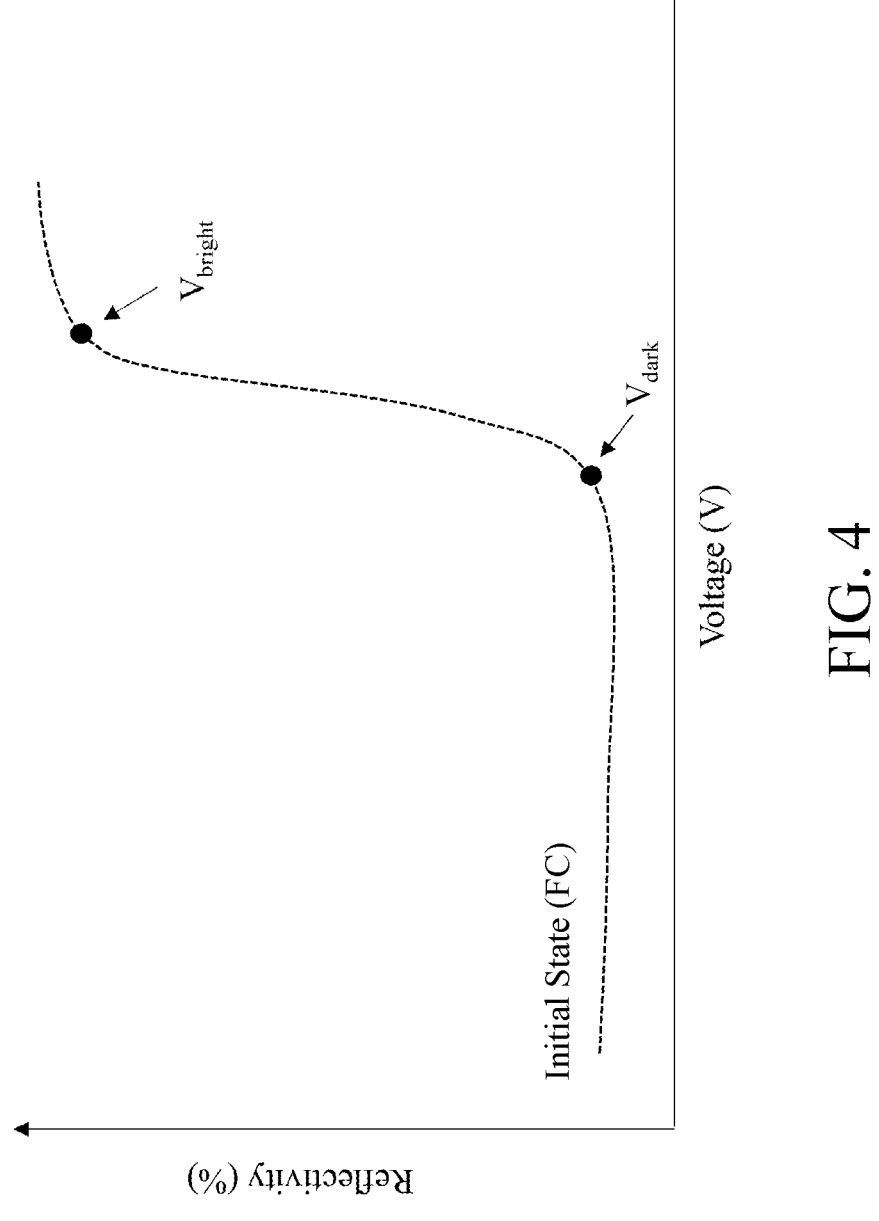
FIG. 4 is a diagram illustrating a reflectivity-vs-voltage (RV) curve for rendering a dark screen and a bright screen.

FIG. 3 is a diagram illustrating the state transitions of the ChLC molecules during the reset stage of the PWM scanning procedure. FIG. 4 is a diagram illustrating a reflectivity-vs-voltage (RV) curve for rendering a dark screen and a bright screen.

For brevity, the display unit 22B is shown in FIG. 3. In some embodiments, the full screen reset stage includes a first reset phase and a second reset phase arranged in sequence. During the first reset phase, one or more first alternating-current (AC) voltage pulses with a voltage amplitude of $V_{HT}$ (e.g., a very high AC voltage difference between the activated scanning electrode and the data electrodes, such as 40V or above) are applied to the ChLC layers 230B, 230G, or 230R, the ChLC molecules 30 within the ChLC layers 230B, 230G, or 230R enter the homeotropic state. Accordingly, the incident light passes through the ChLC molecules 30 and is absorbed by a light absorbing layer 240 at the bottom of the display panel 22, thereby rendering a black screen. During the second reset phase which follows the first reset phase, one or more second AC voltage pulses with a voltage amplitude of VFC are applied to the ChLC layers 230B, 230G, or 230R, allowing the ChLC molecules 30 within the ChLC layers 230B, 230G, or 230R to enter the focal conic state (e.g., dark state) without entering the planar state (e.g., bright state). Additionally, the cycles of the first AC voltage pulses can be different from that of the second AC voltage pulses, and the overall duration of the first AC voltage pulses within the first reset phase can be different from that of the second AC voltage pulses within the second reset phase.

Specifically, after the second AC voltage pulses (e.g., VFC) are applied to the ChLC layers 230B, 230G, or 230R, the ChLC molecules 30 within the ChLC layers 230B, 230G, or 230R are reset to the focal conic state as an initial state before writing pixel data to each pixel circuits at the selection stage of the PWM scanning procedure, thereby improving the contrast and National Television System Committee (NTSC) color space of the display screen rendered on the display panel 22.

Embodiment 1

Figure 5:
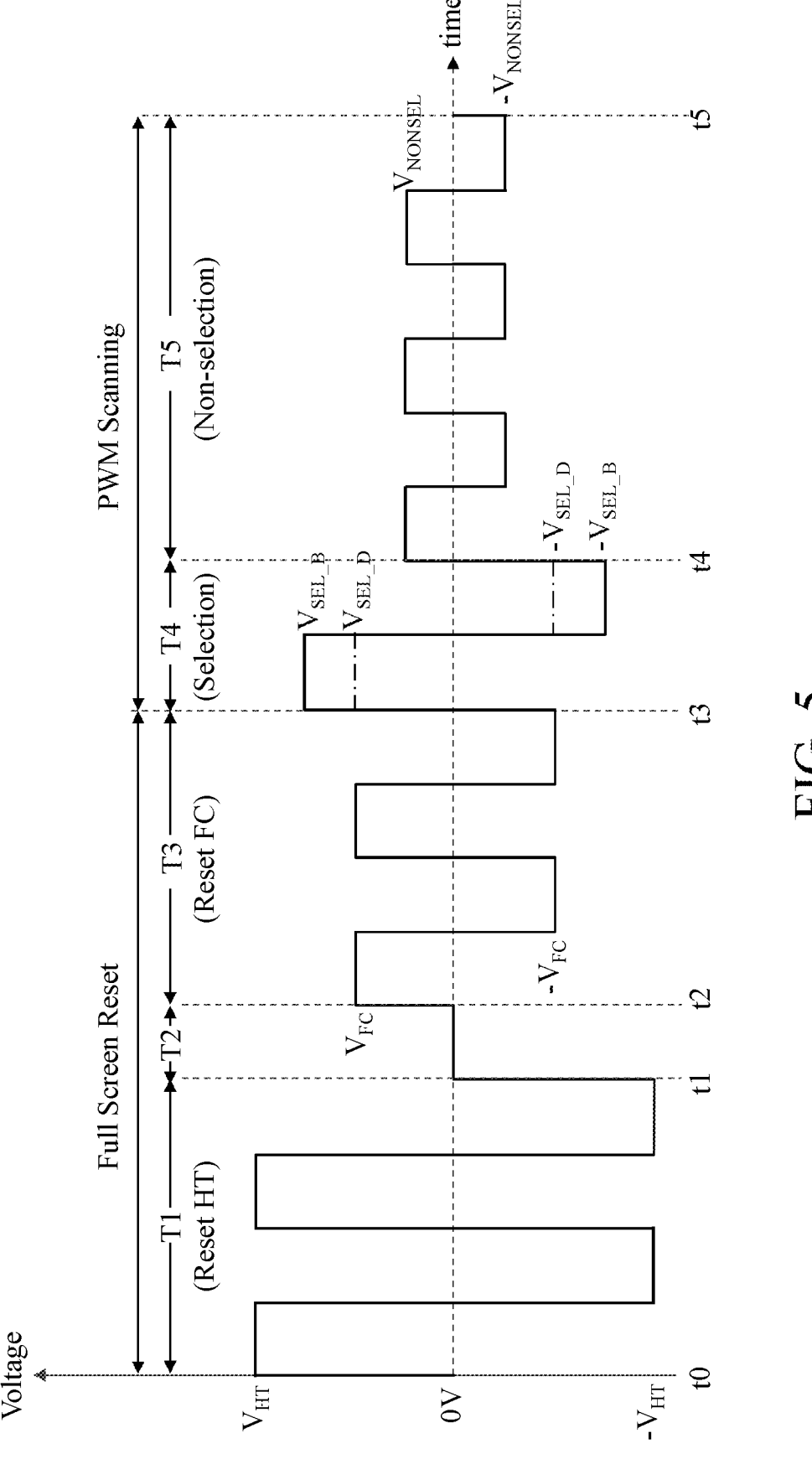
FIG. 5 is a waveform diagram illustrating the AC voltage pulse signal applied to the pixel circuits during a full screen reset stage and a PWM scanning procedure in accordance with some embodiments.

FIG. 5 is a waveform diagram illustrating the AC voltage pulse signal applied to the pixel circuits during a full screen reset stage and a PWM scanning procedure in accordance with some embodiments.

In some embodiments, the full screen reset stage can include a first reset phase (e.g., Reset (HT)) and a second reset phase (e.g., Reset (FC)). During the first reset phase, two first AC voltage pulses with the voltage amplitude of $V_{HT}$ are first applied to all pixel circuits of display units 22B, 22G, and 22R, controlling all ChLC molecules within the ChLC layers 230B, 230G, or 230R to enter the homeotropic (HT) state. In some embodiments, the duration T1 (e.g., from time t0 to t1) of the first AC voltage pulses can be between 10 ms to 300 ms. In some embodiments, the duration T1 of the first AC voltage pulses can be between 10 ms to 490 ms. Subsequently, no voltage is applied to the pixel circuits of display units 22B, 22G, and 22R during a relaxation time (e.g., duration T2 from time t1 to t2), and all ChLC molecules within the ChLC layers 230B, 230G, or 230R will transition from the homeotropic state to the planar state (e.g., bright state) during the relaxation time, enabling the user to perceive a white screen. In some embodiments, the duration T2 of the relaxation time can be between 10 ms to 300 ms. In some embodiments, the duration T2 of the relaxation time can be between 10 ms to 490 ms. Following the relaxation time, the second reset phase is performed. During the second reset phase, two second AC voltage pulses with the voltage amplitude of VFC are applied to the pixel circuits of display units 22B, 22G, and 22R, controlling the ChLC molecules within the ChLC layers 230B, 230G, or 230R to enter the focal conic (FC) state (e.g., dark state), enabling the user to perceive a black screen. In some embodiments, the duration T3 (e.g., from time t2 to t3) of the second AC voltage pulses can be between 10 ms to 300 ms. In some embodiments, the duration T3 of the second AC voltage pulses can be between 10 ms to 490 ms.

Afterwards, during the selection stage (e.g., duration T4 from time t3 to t4) of the PWM scanning procedure, each scanning electrode within the display units 22B, 22G, and 22R are activated sequentially, and a respective selection AC voltage pulse is applied to each pixel circuit on the activate scanning electrode, thereby writing the grayscale pixel value to the respective pixel circuit, which is at an intermediate point between $V_{bright}$ and $V_{dark}$ on the RV curve shown in FIG. 4.

For example, the amplitude of the selection AC voltage pulse is between $V_{SEL\_B}$ and $V_{SEL\_D}$. If the voltage amplitude $V_{SEL\_B}$ is used during the selection stage of a specific pixel circuit, the pixel value of the specific pixel circuit will be approximately 255 (i.e. bright pixel). If the voltage amplitude $V_{SEL\_D}$ is used during the selection stage of a specific pixel circuit, the pixel value of the specific pixel circuit will be approximately 0 (i.e. dark pixel). If the voltage amplitude between $V_{SEL\_B}$ and $V_{SEL\_D}$ is used during the selection stage of a specific pixel circuit, the pixel value of the specific pixel circuit will be between 0 and 255 (i.e. greyscale pixel). It should be noted that the PWM scanning procedure is performed to activate each scanning electrode in each of the display units 22B, 22G, and 22R sequentially. During the selection stage of the pixel circuits on the activated scanning electrode, the user can perceive that the display screen is rendered on the display panel 22 sequentially.

Following the selection stage, a non-selection stage (e.g., duration T5 from time t4 to t5) is performed, and a plurality of AC voltage pulses with a low voltage amplitude $V_{NONSEL}$ are applied to the pixel circuits on the activated scanning electrode. It should be noted that the state of ChLC molecules within the pixel circuits is not changed during the non-selection stage.

Embodiment 2

Figure 6:
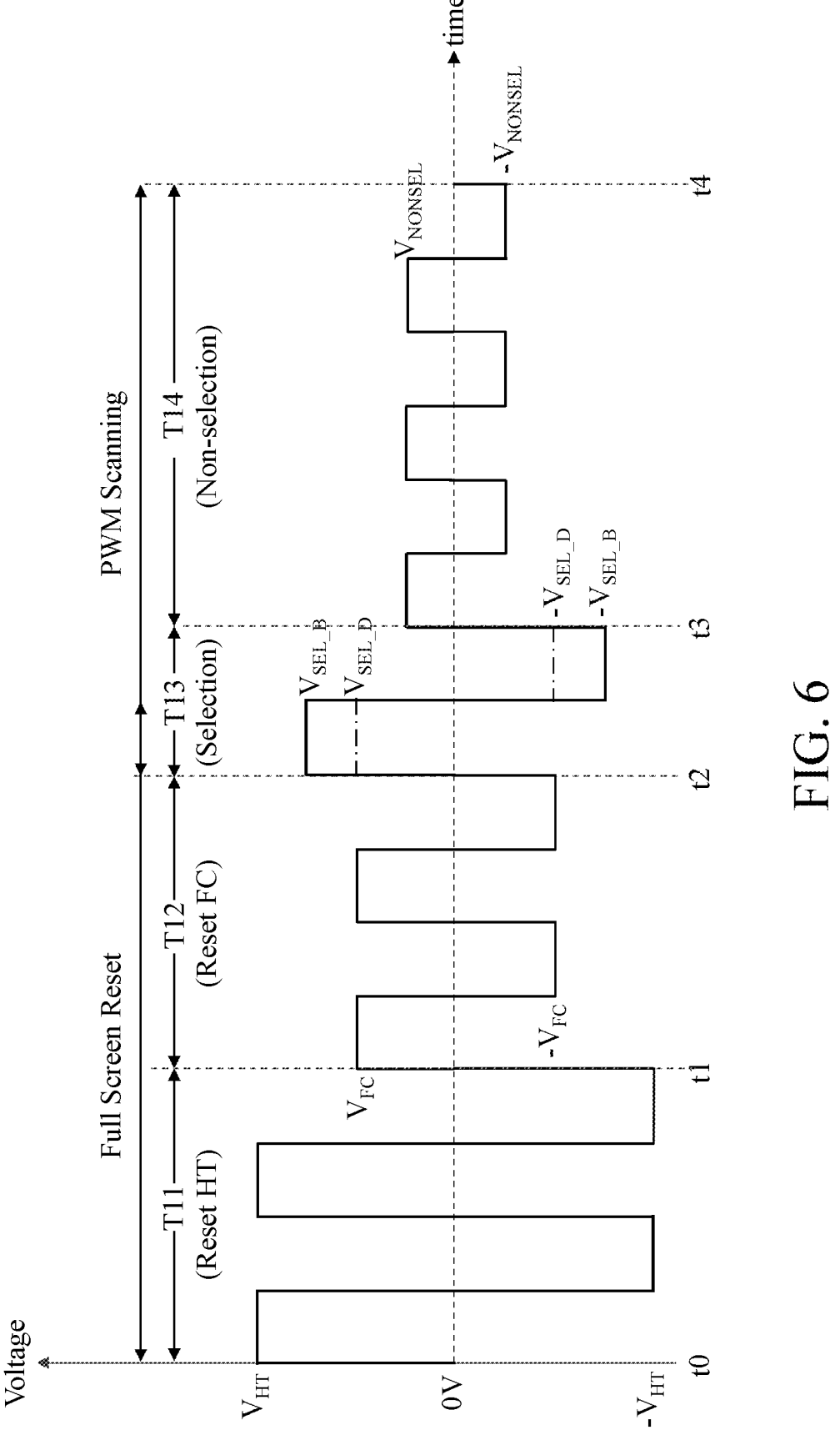
FIG. 6 is a waveform diagram illustrating the AC voltage pulse signal applied to the pixel circuits during a full screen reset stage and a PWM scanning procedure in accordance with some embodiments.

FIG. 6 is a waveform diagram illustrating the AC voltage pulse signal applied to the pixel circuits during a full screen reset stage and a PWM scanning procedure in accordance with some embodiments.

The waveform diagram shown in FIG. 6 is similar to that shown in FIG. 5, with the difference being that, there is no relaxation time between the first reset phase (e.g., duration T11 from time t0 to t1) and the second reset phase (e.g., duration T12 from time t1 to t2) within the full screen reset stage. More specifically, the first reset phase (e.g., duration T11) is directly followed by the second reset phase (e.g., duration T12), and the user will not perceive a white screen since there is no relaxation time following the first reset phase to allow the ChLC molecules of all pixel circuits within the display units 22B, 22G, and 22R to transition from the homeotropic state to the planar state (e.g., bright state). Instead, the ChLC molecules of all pixel circuits will transition from the homeotropic state directly to the focal conic state (e.g., dark state), enabling the user to perceive a black screen. In some embodiments, the durations T11 and T12 are between 10 ms and 300 ms. In some embodiments, the durations T11 and T12 are between 10 ms and 490 ms. The selection stage (e.g., duration T13 from time t2 to t3) and the non-selection stage (e.g., duration T14 from time t3 to t4) during the PWM scanning procedure shown in FIG. 6 is similar to those shown in FIG. 5, and thus the details thereof are repeated here.

Embodiment 3

Figure 7:
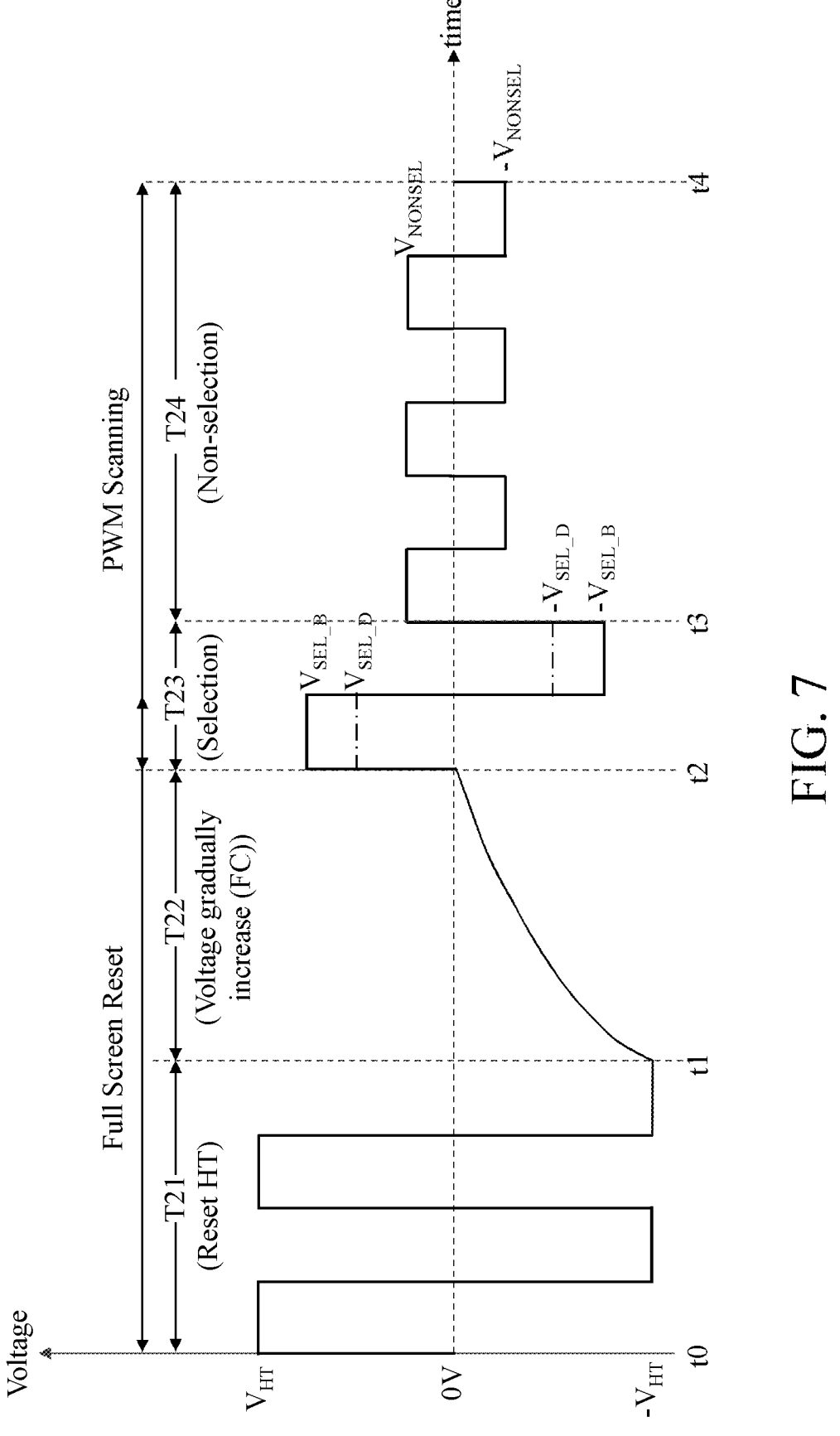
FIG. 7 is a waveform diagram illustrating the AC voltage pulse signal applied to the pixel circuits during a full screen reset stage and a PWM scanning procedure in accordance with some embodiments.

FIG. 7 is a waveform diagram illustrating the AC voltage pulse signal applied to the pixel circuits during a full screen reset stage and a PWM scanning procedure in accordance with some embodiments.

The waveform diagram shown in FIG. 7 is similar to that shown in FIG. 6, with the difference being that, the voltage applied to the pixel circuits gradually increases during the second reset phase (e.g., duration T22 from time t1 to t2) in FIG. 7. More specifically, the first reset phase (e.g., duration T21 from time t0 to time t1) is directly followed by the second reset phase (e.g., duration T22), and the user will not perceive a white screen since there is no relaxation time following the first reset phase to allow the ChLC molecules of all pixel circuits within the display units 22B, 22G, and 22R to transition from the homeotropic state to the planar state (e.g., bright state). When the AC voltage is at $-V_{HT}$ at the end of the first reset phase, the voltage applied to all pixel circuits within the display units 22B, 22G, and 22R gradually increases to 0V. Additionally, the duration T22 of the second reset phase can be different from the duration T21 of the first reset phase. In some embodiments, the durations T21 and T22 are between 10 ms and 300 ms. In some embodiments, the durations T21 and T22 are between 10 ms and 490 ms.

Specifically, when the voltage applied to all pixel circuits within the display units 22B, 22G, and 22R gradually increases to 0V, the ChLC molecules of all pixel circuits will transition from the homeotropic state directly to the focal conic state (e.g., dark state), enabling the user to perceive a black screen. The selection stage (e.g., duration T23 from time t2 to t3) and the non-selection stage (e.g., duration T24 from time t3 to t4) during the PWM scanning procedure shown in FIG. 7 is similar to those shown in FIG. 5, and thus the details thereof are repeated here.

Embodiment 4

Figure 8:
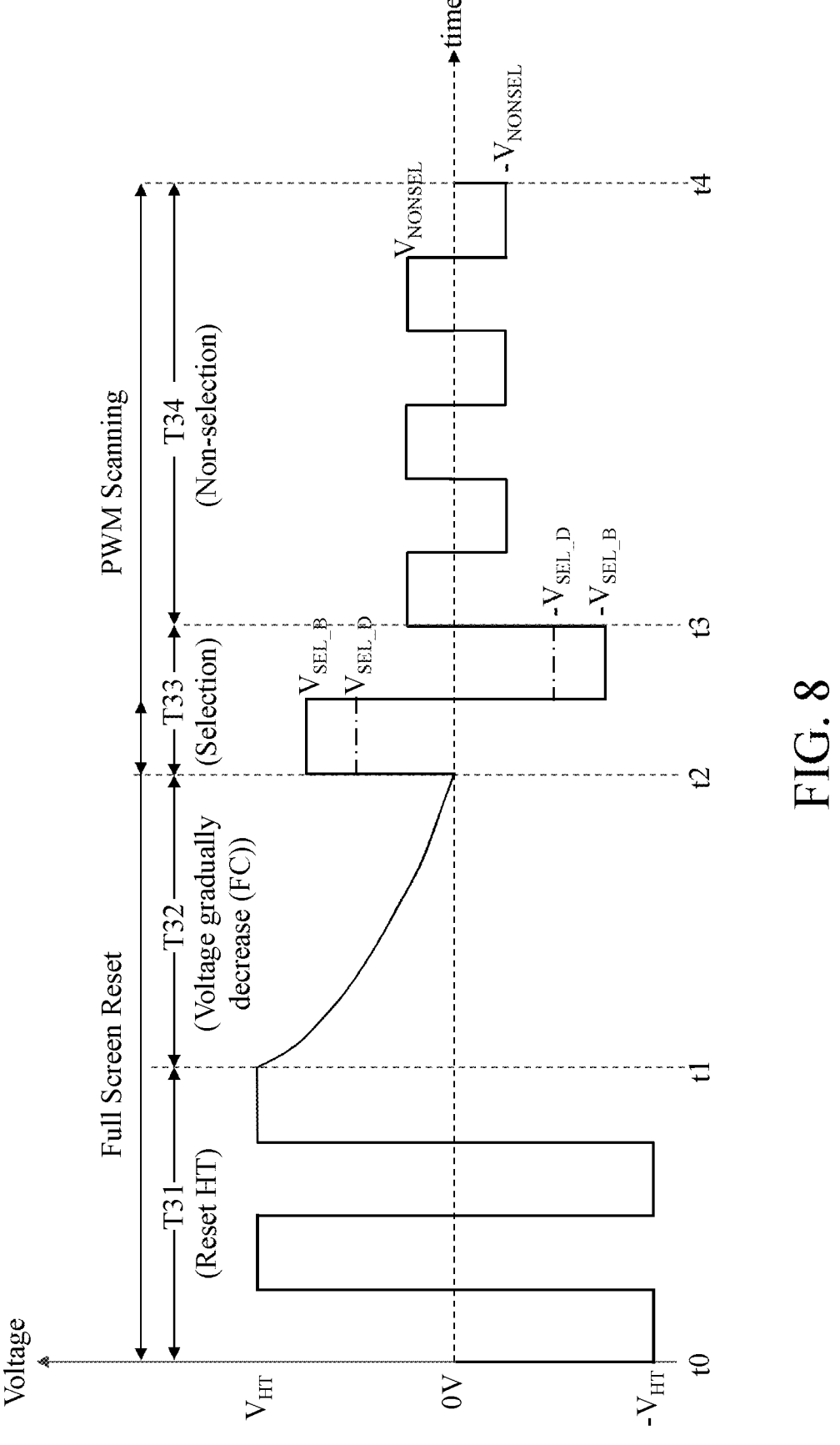
FIG. 8 is a waveform diagram illustrating the AC voltage pulse signal applied to the pixel circuits during a full screen reset stage and a PWM scanning procedure in accordance with some embodiments.

FIG. 8 is a waveform diagram illustrating the AC voltage pulse signal applied to the pixel circuits during a full screen reset stage and a PWM scanning procedure in accordance with some embodiments.

The waveform diagram shown in FIG. 8 is similar to that shown in FIG. 7, with the difference being that, the voltage applied to the pixel circuits gradually decreases during the second reset phase (e.g., duration T32 from time t1 to time t2) in FIG. 8. More specifically, the first reset phase (e.g., duration T31 from time t0 to t1) is directly followed by the second reset phase (e.g., duration T32), and the user will not perceive a white screen since there is no relaxation time following the first reset phase (e.g., duration T31) to allow the ChLC molecules of all pixel circuits within the display units 22B, 22G, and 22R to transition from the homeotropic state to the planar state (e.g., bright state). When the AC voltage is at $V_{HT}$ at the end of the first reset phase (e.g., duration T31), the voltage applied to all pixel circuits within the display units 22B, 22G, and 22R gradually decreases to 0V. Additionally, the duration of the second reset phase (e.g., duration T32) can be different from that of the first reset phase (e.g., duration T31). In some embodiments, the durations T31 and T32 are between 10 ms and 300 ms. In some embodiments, the durations T31 and T32 are between 10 ms and 490 ms.

Specifically, when the voltage applied to all pixel circuits within the display units 22B, 22G, and 22R gradually decreases to 0V, the ChLC molecules of all pixel circuits will transition from the homeotropic state directly to the focal conic state (e.g., dark state), enabling the user to perceive a black screen. The selection stage (e.g., duration T33 from time t2 to t3) and the non-selection stage (e.g., duration T34 from time t3 to t4) during the PWM scanning procedure shown in FIG. 8 is similar to those shown in FIG. 5, and thus the details thereof are repeated here.

In view of the above, compared with the technique where the ChLC molecules are reset to the planar state by the reset phase, by using the techniques of applying different reset AC voltages in different reset phases as described in the embodiments 1 to 4, the contrast and NTSC color space of the display image rendered by the ChLC display device can be improved (e.g., improving the contrast from 7 to 10, and NTSC color space from 23% to 32%), while the reflectivity of the ChLC display device can be maintained (e.g., approximately 29%). Furthermore, the user will not perceive residual images while performing the full screen reset operation on the ChLC display device, thereby improving the user's experience.

FIG. 9 is a flowchart of a method for driving a cholesteric liquid-crystal display in accordance with some embodiments. Please refer to FIG. 2 and FIG. 9. The sequence in which the steps of method 900 are depicted in FIG. 9 is for illustration only; the operations of method 900 are capable of being executed in sequences that differ from that depicted in FIG. 9. It is understood that additional operations may be performed before, during, and/or after the method 900 depicted in FIG. 9, and that some other processes may only be briefly described herein. Method 900 may include steps 910 to 920.

Step 910: Performing a full screen reset procedure to the cholesteric liquid-crystal display device to control cholesteric molecules within pixel circuits of the cholesteric liquid-crystal display device to enter a focal conic state. In some embodiments, the full screen reset procedure includes a first reset phase and a second reset phase. In some embodiments, a relaxation time immediately follows the first reset phase, and the second reset phase immediately follows the relaxation time, as shown in FIG. 5. In some embodiments, the second reset phase immediately follows the first reset phase, as shown in FIGS. 6, 7, and 8.

Step 920: Performing a pulse-width modulation (PWM) scanning procedure, which follows the full screen reset procedure, on the cholesteric liquid-crystal display device to render an image on the cholesteric liquid-crystal display device. In some embodiments, the PWM scanning procedure can be referred to the embodiments of FIGS. 5 to 8, and it includes a selection stage and a non-selection stage. The selection stage may include a voltage pulse with a specific voltage amplitude to control the pixel value of a respective pixel circuit. During the non-selection stage, and a plurality of AC voltage pulses with a low voltage amplitude (e.g., $V_{NONSEL}$ shown in FIGS. 5 to 8) are applied to the pixel circuits on the activated scanning electrode. It should be noted that the state of ChLC molecules within the pixel circuits is not changed during the non-selection stage.

While the present disclosure has been described with reference to specific embodiments, it is evident that many alternatives, modifications, and variations may be apparent to those skilled in the art. For example, various components of the embodiments may be interchanged, added, or substituted in other embodiments. Also, all of the elements of each figure are not necessary for operation of the disclosed embodiments. For example, one of ordinary skill in the art of the disclosed embodiments would be able to make and use the teachings of the present disclosure by simply employing the elements of the independent claims. Accordingly, embodiments of the present disclosure as set forth herein are intended to be illustrative, not limiting. Various changes may be made without departing from the spirit and scope of the present disclosure.

Even though numerous characteristics and advantages of the present disclosure have been set forth in the foregoing description, together with details of the structure and function of the invention, the disclosure is illustrative only. Changes may be made to details, especially in matters of shape, size, and arrangement of parts, within the principles of the invention to the full extent indicated by the broad general meaning of the terms in which the appended claims are expressed.

What is claimed is:

1. A display device, comprising:
   a display panel, comprising:
      a first substrate on which a plurality of first electrodes extending in a first direction are formed;
      a second substrate on which a plurality of second electrodes extending in a second direction different from the first direction are formed;
      a cholesteric liquid-crystal layer formed between the first substrate and the second substrate; and
   a driving circuit section, configured to apply a plurality of alternating-current (AC) voltage pulses to pixel circuits at intersections between the first electrodes and the second electrodes,
   wherein the driving circuit section is further configured to perform a full screen reset procedure to the display panel, which is followed by a pulse-width modulation (PWM) scanning procedure, to control cholesteric molecules within the pixel circuits to enter a focal conic state, wherein:
      the full screen reset procedure comprises a first reset phase and a second reset phase arranged in sequence;
      the cholesteric molecules within the pixel circuits enter a homeotropic state during the first reset phase, and enter the focal conic state during the second reset phase;
      a plurality of first AC voltage pulses with a first voltage amplitude are applied to the pixel circuits during the first reset phase; and
      a differential voltage sensed by the cholesteric molecules within the cholesteric liquid-crystal layer at an end of the first reset phase equals to a positive first voltage with the first voltage amplitude.

2. The display device of claim 1, wherein a first duration of the first reset phase and a second duration of the second reset phase are between 10 ms and 490 ms.

3. The display device of claim 1, wherein the driving circuit section gradually decreases the differential voltage sensed by the cholesteric molecules within the pixel circuits gradually from the positive first voltage to 0V during the second reset phase.

4. A scan driving method for use in a cholesteric liquid-crystal display device, the method comprising:

performing a full screen reset procedure to the cholesteric liquid-crystal display device to control cholesteric molecules within pixel circuits of the cholesteric liquid-crystal display device to enter a focal conic state;

performing a pulse-width modulation (PWM) scanning procedure, which follows the full screen reset procedure, on the cholesteric liquid-crystal display device to render an image on the cholesteric liquid-crystal display device, wherein the full screen reset procedure comprises a first reset phase and a second reset phase arranged in sequence;

controlling the cholesteric molecules within the cholesteric liquid-crystal display device to enter a homeotropic state during the first reset phase, and to enter the focal conic state during the second reset phase; and applying a plurality of first AC voltage pulses with a first voltage amplitude to the pixel circuits during the first reset phase, wherein a differential voltage sensed by the cholesteric molecules within the pixel circuits at an end of the first reset phase equals to a positive first voltage with the first voltage amplitude.

5. The method of claim 4, wherein a first duration of the first reset phase and a second duration of the second reset phase are between 10 ms and 490 ms.

6. The method of claim 4, further comprising: gradually decreasing the differential voltage sensed by the cholesteric molecules within the pixel circuits from the positive first voltage to OV during the second reset phase.

\* \* \* \* \*